(12) United States Patent
Kaul et al.

(10) Patent No.: US 12,353,375 B2
(45) Date of Patent: Jul. 8, 2025

(54) AUTOMATED SELECTION AND ORDERING OF DATA QUALITY RULES DURING DATA INGESTION

(71) Applicant: INTERNATIONAL BUSINESS MACHINES CORPORATION, Armonk, NY (US)

(72) Inventors: Akshar Kaul, Bangalore (IN); Hima Patel, Bengaluru (IN); Shanmukha Chaitanya Guttula, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/505,942

(22) Filed: Nov. 9, 2023

(65) Prior Publication Data

US 2025/0156385 A1    May 15, 2025

(51) Int. Cl.
*G06F 11/00* (2006.01)
*G06F 16/215* (2019.01)

(52) U.S. Cl.
CPC ................................ *G06F 16/215* (2019.01)

(58) Field of Classification Search
None
See application file for complete search history.

(56) References Cited

U.S. PATENT DOCUMENTS

| | | |
|---|---|---|
| 8,843,487 B2 | 9/2014 | Mcgraw et al. |
| 9,082,076 B2 | 7/2015 | Miranda et al. |
| 9,519,695 B2 | 12/2016 | Sampathkumaran et al. |
| 9,547,824 B2 | 1/2017 | Indeck et al. |
| 10,459,881 B2 | 10/2019 | Barth et al. |
| 10,540,436 B2 | 1/2020 | Studer et al. |
| 10,783,116 B2 | 9/2020 | Wong et al. |
| 11,315,665 B2 | 4/2022 | Poblenz et al. |

(Continued)

FOREIGN PATENT DOCUMENTS

| | | | |
|---|---|---|---|
| AU | 2019201496 B2 | 3/2021 | |
| CA | 2887661 C | * 8/2022 | ........... G06F 16/215 |
| CN | 105550511 B | 2/2018 | |

OTHER PUBLICATIONS

Mock, Data Quality Analysis for Food Composition Databases. Sep. 2011. ETH Library.*

(Continued)

*Primary Examiner* — Tuankhanh D Phan
(74) *Attorney, Agent, or Firm* — CHIP LAW GROUP (57) ABSTRACT

Selecting and ordering the execution of data quality rules includes generating a snapshot of a table-formatted dataset. The snapshot comprises a reduced number of rows of the dataset such that each column variation of the dataset is included in the snapshot. A predetermined collection of data quality (DQ) rules is executed on the snapshot. One or more performance statistics is determined for each of the DQ rules. The performance statistics indicate a likelihood that a DQ rule determines a data quality deficiency. Based on the performance statistics, a subset of the DQ rules is generated. Each DQ rule of the subset is selected based on the likelihood that the DQ rule selected detects a quality deficiency. An ordered subset of selected DQ rules is generated by ordering the application of each of the subset of DQ rules selected. The ordering specifies a sequence for executing each selected DQ rule.

20 Claims, 8 Drawing Sheets

(56) References Cited

U.S. PATENT DOCUMENTS

| | | |
|---|---|---|
| 11,599,813 B1 * | 3/2023 | Yuan .................. G06N 20/00 |
| 2018/0052872 A1 | 2/2018 | Marrelli et al. |
| 2019/0370233 A1 | 12/2019 | Yamashita et al. |
| 2020/0250557 A1 | 8/2020 | Kishimoto et al. |
| 2021/0124751 A1 | 4/2021 | Jennings |

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

* cited by examiner

AUTOMATED SELECTION AND ORDERING OF DATA QUALITY RULES DURING DATA INGESTION

BACKGROUND

This disclosure relates to data processing, and more particularly, to selecting and ordering the application of data quality rules during ingestion of the raw data by a data lake or other data repository.

Enterprises such as business and governmental organizations, as well as other information technology (IT) users, increasingly utilize data contained in large datasets, including so-called big data. Such datasets are typically very large and/or very complex. Data comprising vast pools of raw data, which is typically unstructured and unfiltered, is frequently stored by enterprises and other users in data lakes, data catalogs, or other data repositories. The raw data is often stored formatted as tables. Thus, an enterprise data lake or other data repository may contain a very large set of tables, each row of each table typically comprising hundreds or even thousands of columns.

SUMMARY

In one or more embodiments, a method includes generating a snapshot of a table-formatted dataset. The snapshot provides a sample comprising a reduced number of rows of the table-formatted dataset such that each column variation of the table-formatted dataset is included in the snapshot. The method includes executing a predetermined collection of data quality (DQ) rules on the snapshot. The method includes determining one or more performance statistics for each of the DQ rules. The performance statistics indicate a likelihood that a DQ rule determines a data quality deficiency. The method includes generating, based on the performance statistics, a subset of the DQ rules. Each DQ rule of the subset is selected based on the likelihood that the DQ rule selected detects a quality deficiency. The method includes generating an ordering of executing the subset of DQ rules selected. The ordering specifies a sequence for applying each DQ rule of the subset to the table-formatted dataset.

The foregoing and other implementations can each optionally include one or more of the following features, alone or in combination. Some example embodiments include all of the following features in combination.

In one aspect, the method includes applying each of the ordered subset of selected DQ rules to the table-formatted dataset in accordance with the ordering and flagging each row for which a data deficiency has been detected by a DQ rule belonging to the ordered subset of DQ rules.

In another aspect, the method includes generating an updated snapshot in response to a newly received dataset and generating, based on the updated snapshot, another ordered subset of selected DQ rules.

In another aspect, the method includes generating an explanation of the selecting and ordering of execution of each DQ rule belonging to the ordered subset of DQ rules.

In another aspect, the method includes performing data cleaning on each row of the table-formatted dataset having a quality deficiency detected by a DQ rule belonging to the ordered subset of DQ rules. A row is marked for cleaning when a data deficiency is first detected by one of the DQ rules of the ordered subset and no other of the DQ rules executes on the row after the data deficiency is first detected.

In another aspect, generating a snapshot in accordance with the method includes constructing a bipartite graph comprising two sets of vertices, one set of vertices corresponding to rows of the table-formatted dataset, and one set of vertices corresponding to cell values for each column of the table-formatted dataset.

In another aspect the ordering of execution of selected DQ rules is based on minimizing processing time for detecting one or more quality deficiencies of one or more rows of the table-formatted dataset. Once a data deficiency is detected for a row of table-formatted data, the row is flagged, and no other selected DQ rules need be run on that row. Accordingly, prioritizing execution of DQ rules that are more likely to rapidly detect a data deficiency, on average, reduces overall processing time for determining which rows should be marked for cleaning or other handling of data deficiencies.

In one or more embodiments, a system includes one or more processors configured to initiate executable operations as described within this disclosure.

In one or more embodiments, a computer program product includes one or more computer-readable storage media and program instructions collectively stored on the one or more computer-readable storage media. The program instructions are executable by a processor to cause the processor to initiate operations as described within this disclosure.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

While the disclosure concludes with claims defining novel features, it is believed that the various features described within this disclosure will be better understood from consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to data processing, and more particularly, to selecting and ordering the application of data quality (DQ) rules during ingestion of the raw data by a data lake or other data repository. Data ingestion is the process of importing data from a data source to a destination such as a data lake (e.g., cloud-based) or other data storage facility. Data may be ingested in real time (e.g., streaming data) or in batches, typically depending on the source and the destination of the data. Raw data that is unstructured and unfiltered may pose risks that the data's quality is deficient in some respects. For example, certain of the ingested data may be incorrectly formatted, out-of-range, violative of inter-element dependencies (e.g., dependencies of values among different columns of a row, given that the data is formatted as a table), or other data quality deficiency. Accordingly, the data may be subjected to one or more DQ rules to determine the data's quality at or near the time of ingestion. Applying the DQ rule(s), an IT system throws an exception or flags an error if data does not conform to the DQ rule(s). A flagged row of data formatted as a table may be processed by a data cleaning sub-system that is capable of correcting the data deficiencies detected by the DQ rule(s). One or more of the DQ rules may apply to each column of the table to ensure the quality of the data.

Because the number of columns is typically extremely large—often hundreds or even thousands—the application of the DQ rules, though safeguarding data quality, is usually intensive with respect to both computer resources and processing time. Thus, application of DQ rules is typically both compute and time intensive. Conventional systems, in accordance with conventional techniques, run a DQ rule on the data irrespective of the DQ rule's detection rate. If a DQ rule's detection rate is zero, then the data source is providing correct data. Nonetheless, because the DQ rule is executed regardless of the zero-detection rate, the DQ rule consumes computer resources and time without improving the quality of the data processed. The more DQ rules running, the lower the data ingestion rate. Moreover, because conventionally the order in which the DQ rules are run is ad hoc, without a predetermined strategy, one or more DQ rules that provide no value may run before even the first DQ rule that is likely to detect data deficiencies is executed.

In accordance with the inventive arrangements disclosed herein, methods, systems, and computer program products are provided that are capable of automatically selecting DQ rules and ordering their execution on incoming data that is to be added to a data lake or other data repository. The DQ rules are selected and ordered for execution in accordance with the inventive arrangements in a manner most likely to minimize computer resources usage and/or processing time for detecting data deficiencies of the incoming data.

For a given set of DQ rules, conventional systems execute each and every DQ rule over the entire set of data regardless of processing efficiency or other considerations. By contrast, the inventive arrangements automatically select for execution a subset of DQ rules, the subset comprising only those DQ rules that the inventive arrangements have determined are sufficiently likely to detect a data deficiency. With a conventional system, such a rule selection must be performed manually by disabling the corresponding rules stored in the repository.

The inventive arrangements, accordingly, are capable of accelerating the process of validating DQ rules and enhancing processing efficiency of the DQ rules with respect to the incoming data. In certain embodiments, the inventive arrangements allow the user to specify whether to optimize the selecting and ordering of the application of the DQ rules either with respect to computer resources or processing time. The inventive arrangements, moreover, are capable of autonomously changing the selected DQ rules and/or order of execution in response to changes in the distribution of incoming data.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
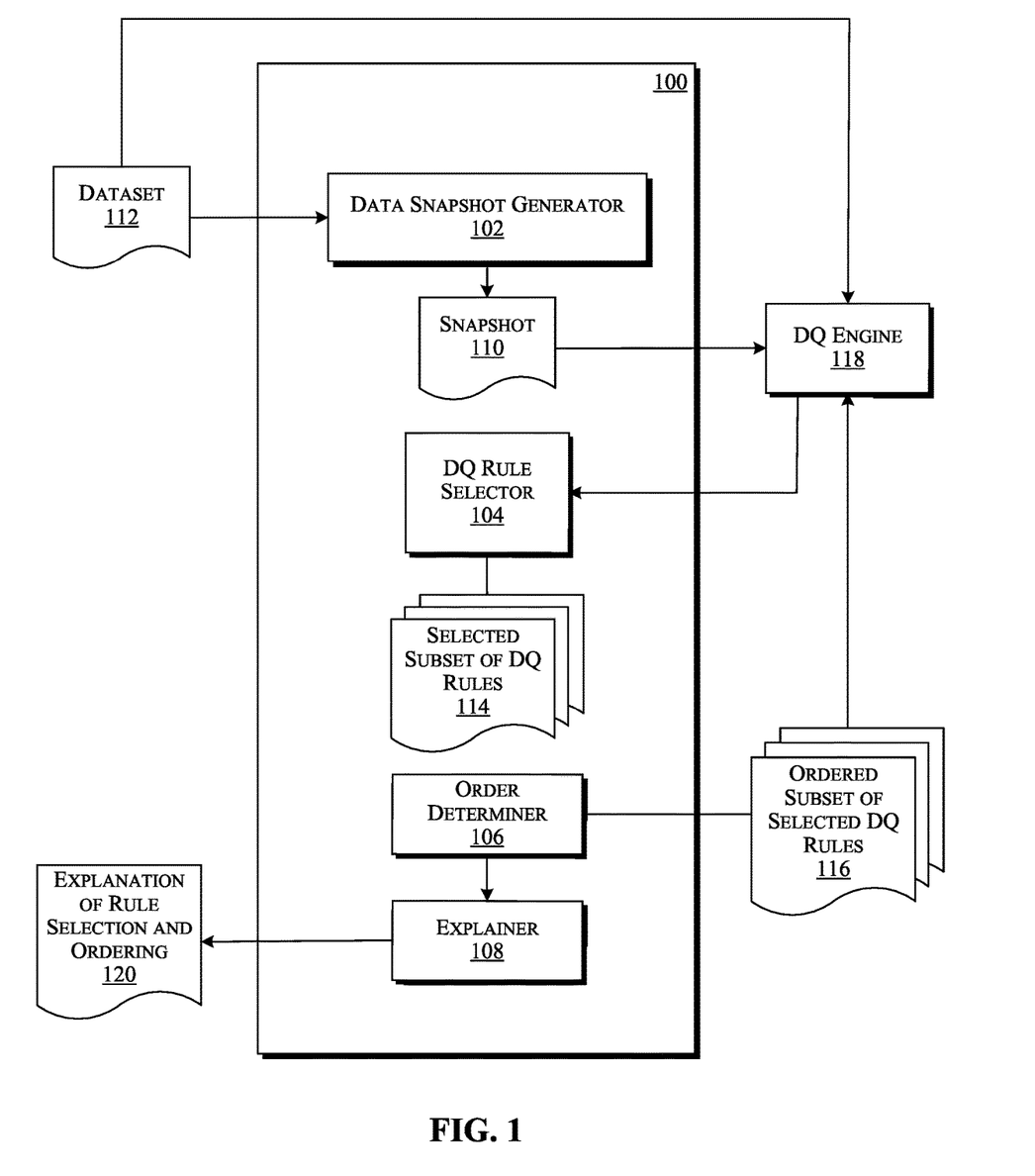
FIG. 1 illustrates an example architecture of a rule selection and ordering (RSO) framework that automatically selects and orders the application of data quality rules.

FIG. 1 illustrates an example architecture of a rule selection and ordering (RSO) framework that automatically selects and orders the application of DQ rules. RSO framework 100 may be implemented in software that is executable on the hardware of a computer such as computer 701 operating in computing environment 700, as described in reference to FIG. 7.

In the example architecture of FIG. 1, RSO framework 100 illustratively includes data snapshot generator 102, DQ rule selector 104, order determiner 106, and explainer 108. Operatively, based on a snapshot of a dataset generated by data snapshot generator 102, DQ rule selector 104 automatically selects a subset of DQ rules from a predetermined set of DQ rules. The subset of DQ rules is selected based on performance statistics and are most likely to detect data deficiencies. Order determiner 106 determines the order in which each of the selected DQ rules are to be applied to, or executed on, the dataset 112 by DQ engine 118. The specific selection and ordering of the DQ rules by RSO framework 100 are most likely to minimize the time and/or computer resources needed to ensure a certain level of quality of data that is added to a data lake or other data repository. Once selected and ordered for execution, the DQ rules are applied to the entire dataset 112. Dataset 112 may comprise a single, current batch of data, streaming data, or other data arrangement. The same subset of DQ rules and the order of execution of the selected DQ rules is used until the next time-based window, when a new snapshot of data is generated by data snapshot generator 102.

The data may be ingested continuously (e.g., received as streaming data) and/or in batches. Data that fails to satisfy one or more DQ rules, once detected, may be handled in various ways. The flagged data may be rejected without further action, or the data may be manually corrected to conform to the DQ rule(s). In various arrangements, the flagged data may be processed by a data cleaning system. The data cleaning system may automatically reconstruct the data to eliminate the deficiency flagged by the DQ engine 118.

Figure 2:
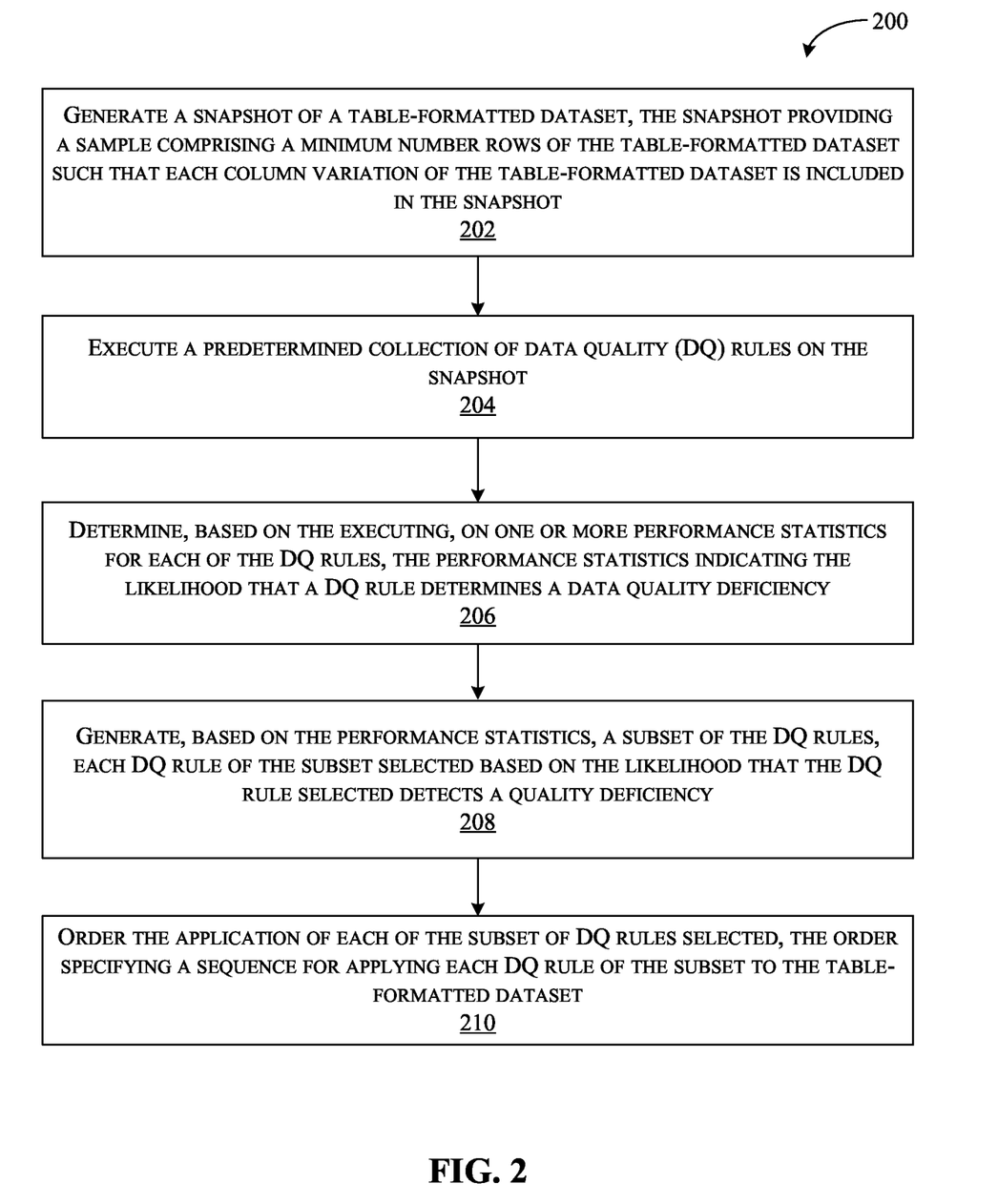
FIG. 2 illustrates an example method of operation of the RSO framework illustrated in FIG. 1.

FIG. 2 illustrates an example method 200 of operation of the RSO framework 100 of FIG. 1.

Referring to FIGS. 1 and 2 collectively, in block 202, data snapshot generator 102 generates snapshot 110 of table-formatted dataset 112. Snapshot 110 provides a data sample comprising selected rows extracted from table-formatted dataset 112. As generated by snapshot generator 102 snapshot 110 includes only a reduced number of rows. The number of rows can be reduced such that each column variation of table-formatted dataset 112 is nonetheless fully captured. Thus, in certain embodiments, the reduced number of rows may be the minimum number of rows needed to fully capture all the variability within table-formatted dataset 112. Snapshot 110 excludes other rows not needed to completely capture the variability.

Figure 3:
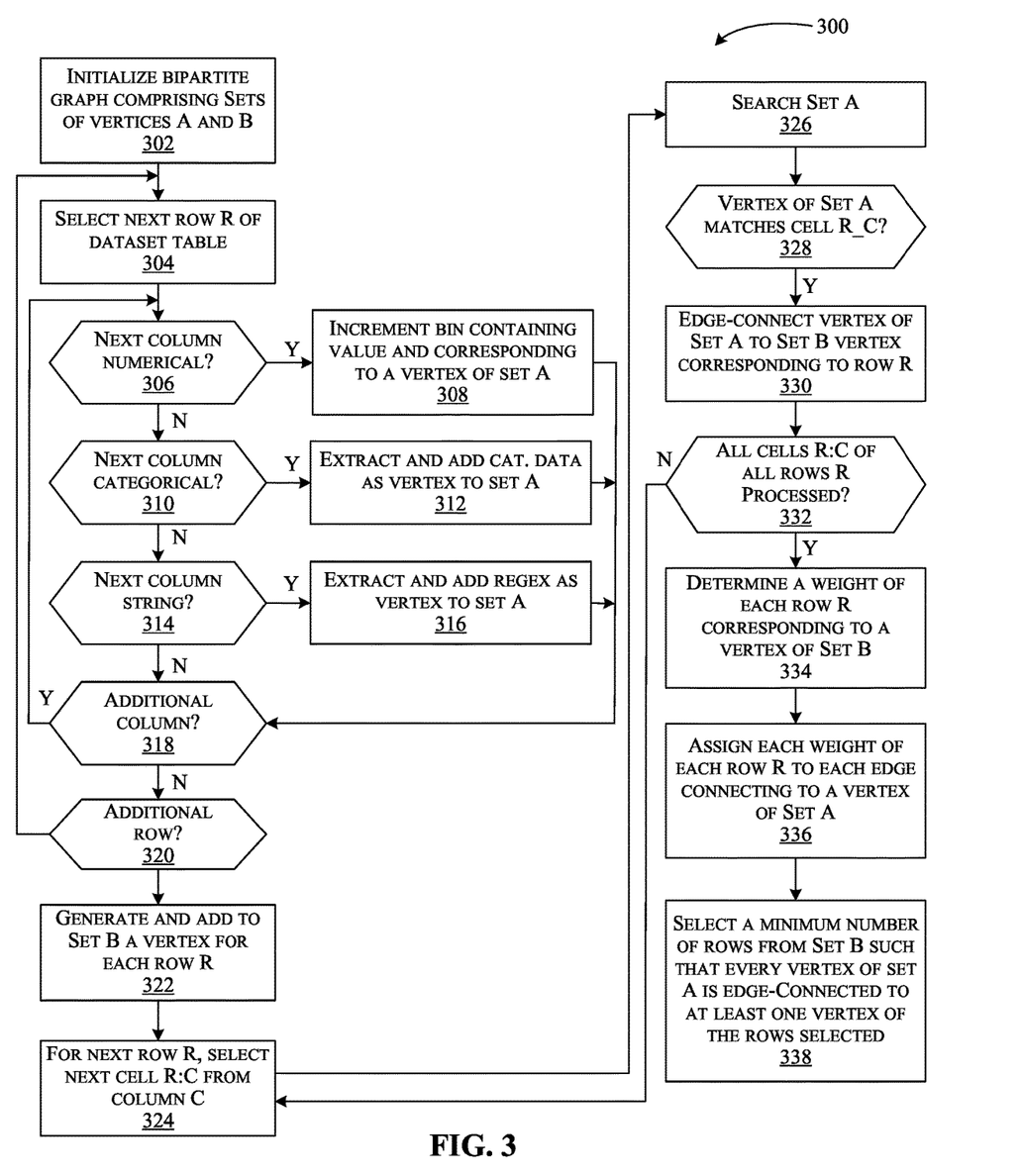
FIG. 3 illustrates an example procedure implemented with the framework of FIGS. 1 and 2 for generating a snapshot of a dataset.

Referring additionally to FIG. 3, an example procedure 300 implemented by data snapshot generator 102 in accordance with certain embodiments is illustrated. Implementing procedure 300, data snapshot generator 102 generates snapshot 110 such that the resulting sample comprises the minimum number of rows, each row having the property that it covers as many column variations of table-formatted dataset 112 as possible. Procedure 300 guarantees that all variations for all columns of table-formatted dataset 112 are covered within snapshot 110.

In block 302 of FIG. 3, data snapshot generator 102 initializes a bipartite graph comprising two sets of vertices, Set A and Set B. Set A comprises vertices representing values at cell R: C of table-formatted dataset 112, where R is a row of the table of data, C is a column, and R: C is the cell at row R, column C. Data snapshot generator 102, in block 304, selects row R of table-formatted dataset 112, and determines the type of data of each column C of row R. Illustratively, the types of data comprising table-formatted dataset 112 may include numerical data, categorical data, string data, and/or other types of data. Data snapshot generator 102 sequentially determines the type of data of each column in blocks 306, 310, and 314. If the data is numerical, data snapshot generator 102 increments a bin containing the value by one. A bin is created and incremented by one if data snapshot generator 102 has not already generated one for the corresponding value. Each bin created is added as a vertex of Set A in block 308. If categorical data, then data snapshot generator 102 in block 312 extracts the category (e.g., indicated by an integer, letter, or other symbol) and adds it as a vertex of Set A. If a string, then in block 316 data snapshot generator 102 extracts the string and adds it as a regular expression (regex) as a vertex of Set A. With each row R, data snapshot generator 102 repeats the process for each column until no additional columns C of a row remain in block 318. Data snapshot generator 102 repeats the process for each row R of table-formatted data set 112 until in block 320 no additional rows remain.

In block 322, data snapshot generator 102 generates a vertex of Set B for each row R of table-formatted data 212. In block 324, data snapshot generator 102 selects cell R: C and in block 326 searches set A for vertex whose value matches the row represented by the vertex of Set B. If a match is found in block 328, then data snapshot generator 102 in block 330 edge-connects the vertex of Set A, representing the value of cell R: C, to the vertex of State B representing row R. Data snapshot generator 102 repeats the process until all cells R: C of all rows R are processed at block 332.

Note that each of the different values of each type of data of table-formatted dataset 112 is represented by a vertex of Set A of the bipartite graph. Each row of table-formatted dataset 112 is represented by a vertex of Set B of the bipartite graph. The set B vertices corresponding to the rows are edge connected to Set A vertices representing different values of columns of the rows. For each vertex of Set A, process 300 performs a search of Set B to identify one or more rows having a column with a value that matches and an edge is added connecting the respective vertices. Implementing procedure 300, data snapshot generator 102 identifies the minimum number of rows from set B such that each of the vertices of Set A is edge-connected to at least one vertex of the selected rows.

In block 334, data snapshot generator 102 optionally determines a weight for each row R corresponding to a vertex of Set B. Data snapshot generator 102, in certain embodiments, determines the weight for each row R based on the number of edges that connect the Set B vertex representing row R to vertices of Set A. In block 336, data snapshot generator 102 assigns the weights to the edges. In some embodiments, all edges are weighted equally. In block 338, data snapshot generator 102 selects the minimum number of rows R needed to cover all vertices of Set A. For example, if the Set B vertex of one row has edges to one more Set A vertex than does a Set B vertex of another row, then the former row is selected over the latter.

In certain embodiments, data snapshot generator 102 computes benefit values as a function of the weights and assigns a benefit value to each row. For example, benefit values may be based on the number of vertices of Set A to which the Set B vertex representing row R edge-connects. Data snapshot generator 102, in certain embodiments, implements a greedy algorithm to select rows to add to snapshot 110 based on the assigned benefit values.

More generally, the benefit values assigned to each edge correspond to the importance of the column the edge is associated with. For example, if a row has two columns C1 and C2, where C1 is deemed to be more important than C2, then any edge connecting a vertex in Set A that is associated with C1 will have a greater benefit value (e.g., numerical weight) compared to that of any edge connecting a vertex in Set A that is associated with C2. For each row, the total benefit may be determined as the sum of benefit values of the edges associated with the row.

Referring still to FIGS. 1 and 2, DQ rule selector 104, in block 204, runs a predetermined collection of DQ rules on snapshot 110. DQ rule selector 104 runs each of the predetermined collection of DQ rules to determine the likelihood that each detects a deficiency in the quality of the data.

In block 206, DQ rules selector 104 determines based on executing the predetermined collection of DQ rules on snapshot 110 one or more performance statistics for each of the DQ rules. With respect to each DQ rule, the performance statistics indicate the likelihood or probability that the DQ rule determines a data quality deficiency among the data of snapshot 110.

In block 208, DQ rules selector 104 generates a subset of selected DQ rules 114 from the predetermined collection that ran on snapshot 110. The subset of selected DQ rules 114 is generated by DQ rules selector 104's selectively adding to the subset DQ rules that, based on the performance statistics, are likely to detect one or more quality deficiencies of the types of data comprising table-formatted dataset 112. In certain embodiments, a DQ rule is added to the subset if its detection rate (e.g., number of deficiencies detected within the time window) is greater than a predetermined threshold. For example, if the threshold is one, then a DQ rule is added to the subset only if the DQ rule detects at least one deficiency. Among other arrangements, for example, the threshold is the percentage of rows (e.g., 20 percent) for which the DQ rule detects a data quality deficiency. Otherwise, a DQ rule whose detection rate is less than the threshold is excluded from the subset of selected DQ rules.

In block 210, order determiner 106 orders the application or running of selected DQ rules 114. The order specifies a sequence for executing each of selected DQ rules 114 to table-formatted dataset 112. The order prioritizes the running of selected DQ rules 114 such that DQ rules that are more likely to detect a greater number of data deficiencies are executed ahead of other selected DQ rules. This significantly enhances data processing for identifying data deficiencies because once a row has been identified as having a data deficiency, no further testing of the row needs be performed. That is, if a row is identified as having a deficiency, then the entire row is flagged as a single unit and no further running of additional DQ rules on the row is performed. The remaining DQ rules are skipped altogether. Thus, the running of each of selected DQ rules 114 is prioritized by order determiner 106 such that the higher the deficiency detection rate of a DQ rule, the greater the priority accorded the DQ rule. Each of selected DQ rules 114 executes in accordance with the priorities, sequentially executing from highest to lowest priority.

Figure 4A:
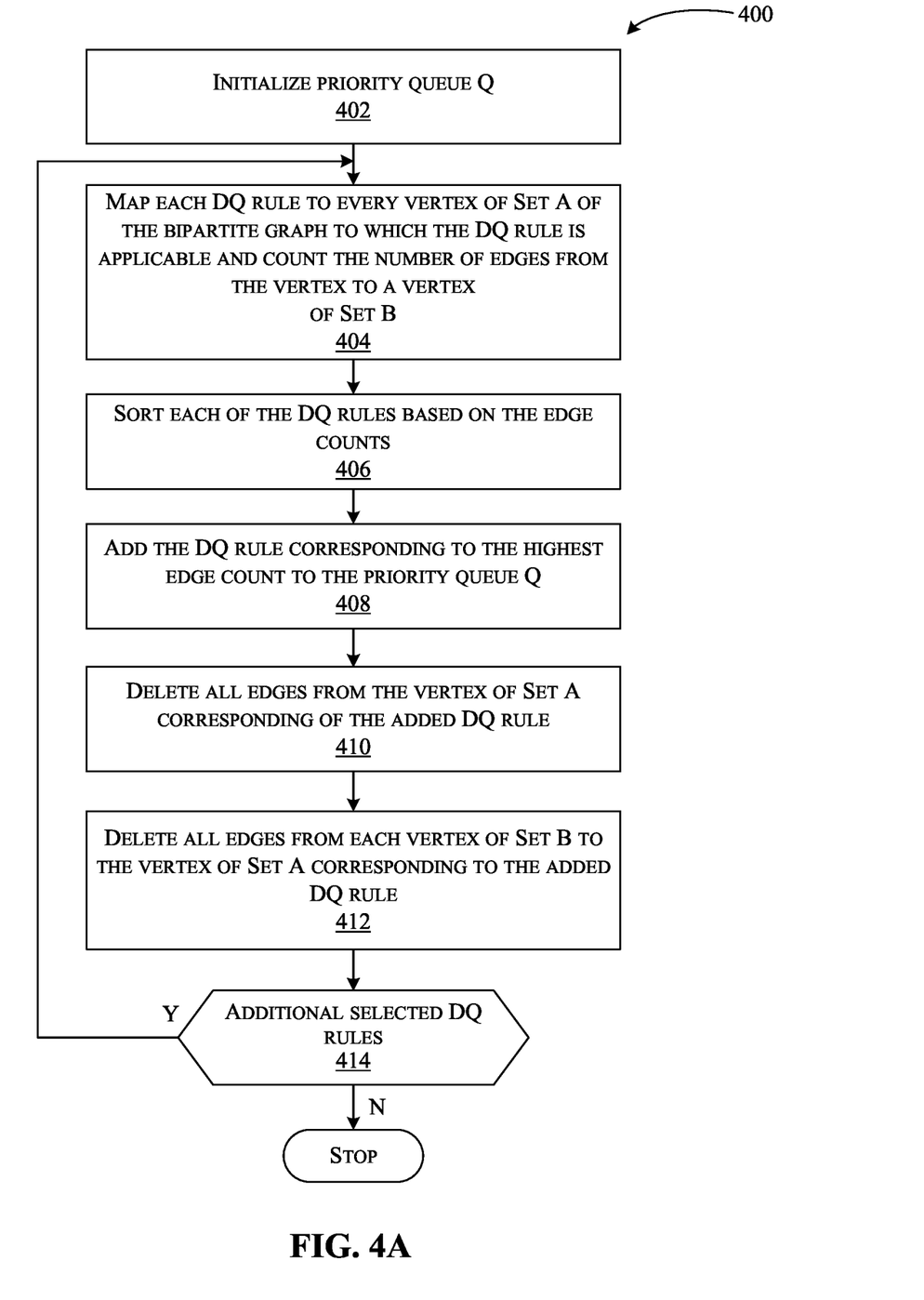
FIGS. 4A and 4B illustrate an example procedure implemented with the framework of FIGS. 1 and 2 for ordering the running of a select set of data quality rules on a dataset.
Figure 4B:
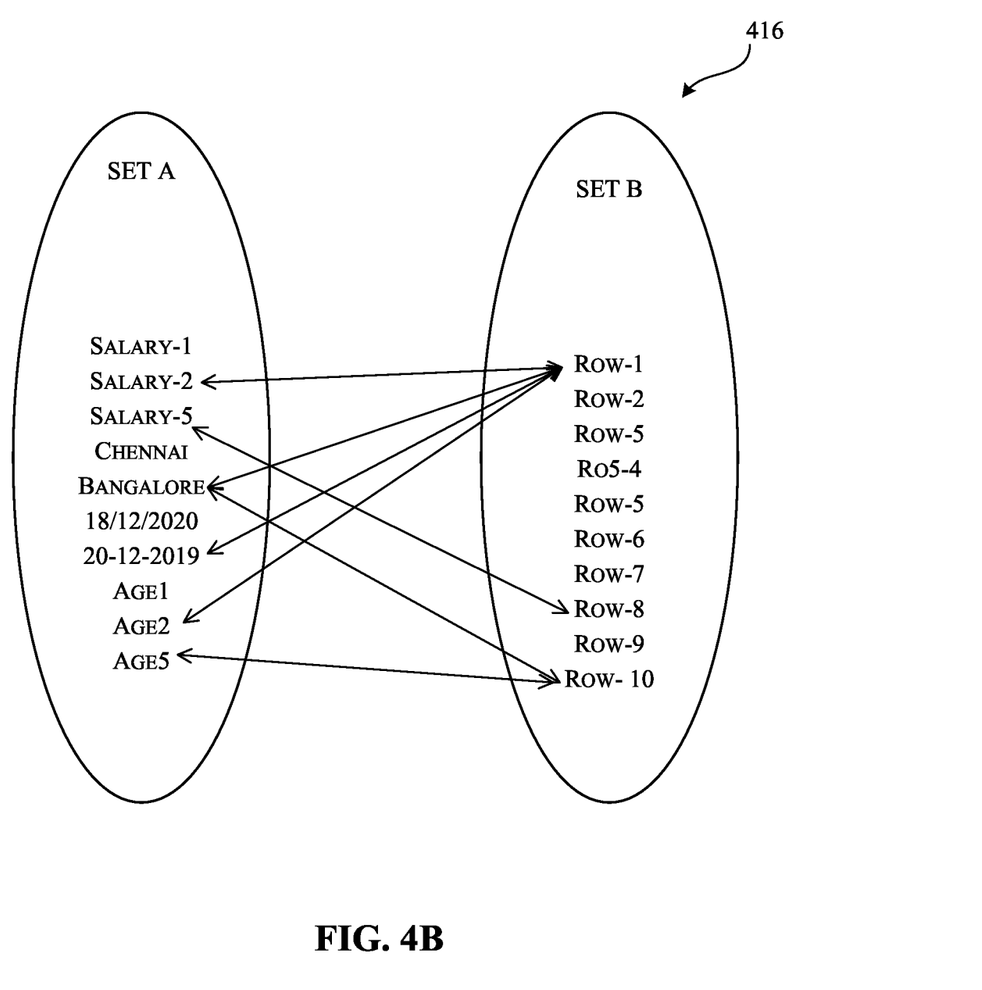

Referring additionally to FIGS. 4A and 4B, an example procedure 400 implemented by order determiner 106 in accordance with certain embodiments is illustrated. Procedure 400 utilizes the dual-set bipartite graph described above in which one set of vertices (Set A) represents column values of table-formatted data 112 and another set of vertices (Set B) 418 represents the rows of table-formatted data 112. In block 402, order determiner 106 initializes priority queue Q.

In block 404 of FIG. 4A, order determiner 106 maps each DQ rule to a vertex of Set A and counts the number of edges from the vertex to one or more vertices of Set B. Order determiner 106, in block 406, sorts the DQ rules based on the counts. In block 408, order determiner 106 adds the DQ rule corresponding to the highest edge count to priority queue Q. In block 410, order determiner 106 deletes all edges from the Set A vertex corresponding to the added DQ rule. Order determiner 106, in block 412, deletes each edge between each vertex of Set B and the vertex of Set A corresponding to the added DQ rule. Order determiner 106 repeats the procedure until at block 404 there are no DQ rules among selected DQ rules 114 remain for ordering.

FIG. 4B schematically illustrates a small portion 416 of the bipartite graph generated by procedure 400, the bipartite graph comprising Sets A and Sets B. Only a few vertices of Set A and Set B are shown. In various arrangements, Set A and Set B of the bipartite graph may each include fewer or many more vertices. Typically, in most applications, both sets of the bipartite graph include many more vertices than those shown. Illustratively, Set A includes ten vertices representing column values of table-formatted dataset 112. The vertices illustratively include bins of numerical data (salary and age), and regexs (locations and dates). In general, the greater the number of distinct values that each of the categories, bins, or regexs can take on, the greater variability of the data within a table-formatted dataset. The sample of edges shown connect vertices of Set B to distinct values found in corresponding columns of the rows of table-formatted data 112, each row represented by a vertex of Set B.

In certain embodiments, order determiner 106 orders or prioritizes selected DQ rules based on the rules' respective probabilities of detecting a data deficiency (e.g., detection rate). In other embodiments, order determiner 106 prioritizes the selected DQ rules based on processing speed of each (e.g., average running time per sample). For example, order determiner 106 may order execution of the selected DQ rules so as to minimize processing time for detecting data deficiencies by each selected DQ rule. To do so, order determiner 106 orders execution of the selected DQ rules such that the more rapidly a selected DQ rule is able detect a data deficiency, the earlier the DQ rule is applied to the dataset. Once a row of table-formatted data is marked as having a data deficiency, no other DQ rules are executed for that row. Thus, executing a selected DQ rule that is most rapid in detecting a first deficiency likely eliminates having to execute other selected DQ rules, and on average reduces processing time to a minimum. In other embodiments, order determiner 106 may order execution of the selected DQ rules based on the importance of the one or more columns of table-formatted data 112 to which each selected DQ rule applies. For example, the user may specify the relative importance of each column, and order determiner 106 responds by prioritizing rules in accordance with the columns to which each DQ rule selected applies.

Referring still to FIGS. 1 and 2, order determiner 106 outputs ordered subset of selected DQ rules 116, which comprises only those DQ rules selected from the predetermined collection of DQ rules based on likelihood of detecting data deficiencies and which are ordered according to the determined priorities. RSO framework 100 may output ordered subset of selected DQ rules 116 to DQ engine 118 to execute on table-formatted dataset 112. Note that RSO framework 100 executes the set of predetermined DQ rules only on snapshot 110. Snapshot 110 is an optimal, or nearly optimal, sample of table-formatted dataset 112 in that it captures all or almost all variability among the columns of table-formatted dataset 112. Yet, snapshot 110 is smaller than table-formatted dataset 112 from which it is derived by data snapshot generator 102. Snapshot 110 thus provides an ideal, or nearly ideal, sample to determine the performance of each DQ rule for detecting data deficiencies within table-formatted dataset 112. The data processing needed to determine data deficiencies is enhanced considerably in that only ordered subset of selected DQ rules 116 are applied to the entirety of table-formatted dataset 112.

In certain embodiments, RSO framework 100 optionally includes explainer 108. Explainer 108 generates and outputs explanation 120 of RSO framework 100's selection and ordering of DQ rules based on snapshot 110. Explanation 120 is generated by explainer 108 based on the performance statistics generated by DQ rule selector 104 and ordering logic implemented by order determiner 106. In some embodiments, explanation 120 is a natural language explanation generated with a natural language model (e.g., generative pre-trained transformer) trained using supervised learning and implemented by explainer 108.

Figure 5:
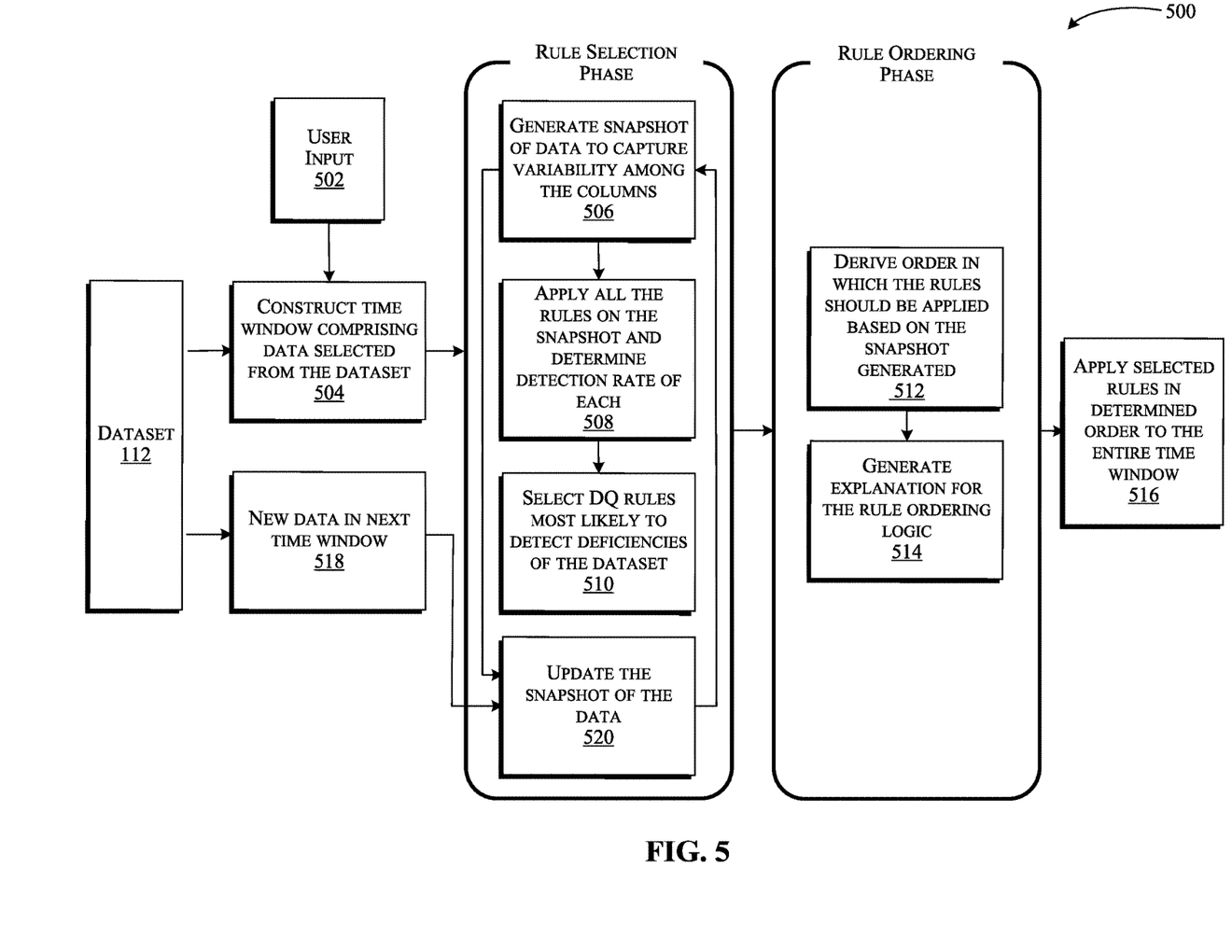
FIG. 5 schematically illustrates certain operative aspects of the framework of FIGS. 1 and 2.

FIG. 5 schematically illustrates certain operative aspects 500 of RSO framework 100. In accordance with certain embodiments, user 502 inputs a priority selection with respect to computer resources or processing time. If user 502 elects to optimize computer resources, then a maximum number of rows are selected in an initial pass of table-formatted dataset 112 by data snapshot generator 102. Potentially, this leads to data snapshot generator 102 generating snapshot 110 in a manner giving snapshot 110 a greater number of rows than if processing time is prioritized. If user 502 elects to prioritize processing time, then only rows having a benefit value (determined as described above) greater than a predetermined threshold are selected in every iterative sequence in generating snapshot 110 by data snapshot generator 102. Once rows of table-formatted dataset 112 are selected, re-computation is done to assign new benefit scores to each and every row. This process continues until all variations are exhausted and leads to picking the minimum number of rows, which reduces process time for both DQ rule selector 104 and order determiner 106.

Whether continuous or static, delivery of table-formatted dataset 112 may be segmented into time windows by a procedure implemented by RSO framework 100 in block 504. During a rule selection phase, in block 506 data snapshot generator 102 generates snapshot 110 to capture variability among the columns of table-formatted dataset 112. In block 508, DQ rule selector 104 executes each of a set of predetermined DQ rules on snapshot 110. Executing all the DQ rules on snapshot 110, DQ rule selector 104 determines performance statistics for each DQ rule based on each DQ rule's execution on snapshot 110. In some embodiments, the statistical performance may be RSO framework-determined detection rates of each of the DQ rules. In block 510, based on the performance statistics, DQ rule selector 104 selects certain of the DQ rules to generate a subset of the entire set of DQ rules. The selected DQ rules are those most likely to detect data deficiencies of dataset 112.

In a subsequent rule ordering phase, in block 512, order determiner 106 derives an order in which the selected DQ rules may optimally be applied based on performance of the selected DQ rules when executed on snapshot 110, thus generating an ordered subset of selected DQ rules. Optionally, in block 514, explainer 108 generates an explanation specifying rule order and/or selection logic in generating the ordered set of selected DQ rules. In block 516, the ordered subset of selected DQ rules may be applied to the entire time window.

The process can be repeated with respect to a subsequent time window in block 518. In certain embodiments, rather than processing the entire dataset with each time window to create an updated snapshot, RSO framework 100 may leverage updates to the database occurring over the time window to incrementally update the snapshot. A benefit of doing so is better performance because RSO framework 100 may select and order DQ rules by processing only the updates rather than processing an entire dataset anew. Another benefit is that RSO framework 100 may weight data according to the data's time of arrival, giving the most recent time window higher weightage compared to older data. This enables RSO framework 100 to capture the changing data distributions and characteristics more rapidly and efficiently. Updates to the database over time can be retrieved by RSO framework 100 implementing a change-data capture feed.

In creating updated snapshots in block 520, at time $t_0$ data snapshot generator 102 creates a bipartite graph, as described above, and generates the updated snapshot with available data $D_0$. RSO framework 100 may track all changes occurring during each time window. At time $t_1$, the data becomes $D_1$, comprising Do plus $W_1$. Data snapshot generator 102 uses $W_1$ to update the bipartite graph and create the new, updated snapshot. Likewise, at time $t_2$, when the data becomes $D_2$, comprising $D_1$ plus $W_2$, data snapshot generator 102 uses $W_2$ to update the bipartite graph and create still another updated snapshot and so on.

In still other embodiments, data snapshot generator 102 may use only data from a given time window, such as data received over the last n number of days. In accordance with such embodiments, data snapshot generator 102 augments the snapshot generation over dynamically changing data with a sliding window approach. Data snapshot generator 102 processes updated data from two windows at time $T_x$. If N is the number of latest windows of data, then the two windows are $W_x$ and $W_{(x-N)}$. $W_x$ comprises data from the latest time window, which data snapshot generator 102 uses to update a snapshot. $W_{(x-N)}$ is data from the oldest time window, which data snapshot generator 102 deletes from data used to generate the updated snapshot.

Irrespective of the other procedures, in accordance with certain embodiments, RSO framework 100 may update data formatted as a table using following procedures to create a snapshot. For updating data with row addition, RSO framework 100 adds a vertex R in a Set B of the bipartite graph, Set B comprising vertices corresponding to rows. For each cell in the row, RSO framework 100 searches buckets or groupings (e.g., categorical data category, numerical values bin, string group of regexs) of Set A of vertices that correspond the cell's value. If a match is found, then RSO framework 100 connects vertex R to the grouping with an edge. If no match is found, then RSO framework 100 creates a bin, bucket, or grouping (depending on the type of data in the cell) and connects it to vertex R of set B. For a row deletion, RSO framework 100, identifies the vertex R of Set B corresponding to the row to be deleted. For each cell of the row corresponding to vertex R, RSO framework 100 determines the bin, bucket, or grouping to which the cell belongs and deletes the edges connecting the cell to vertex R. For updating any row of table-formatted data, RSO framework 100 combines the procedures for row deletion and addition. RSO framework 100 initially performs row deletion and the perform row addition to add back the row as modified according to all updating of the data. RSO framework 100 removes all the vertices of Set A that are not edge connected to one of the vertices of Set B. A snapshot generated in accordance with the procedures includes only the minimum number of rows needed to cover every value included in the dataset.

Figure 6:
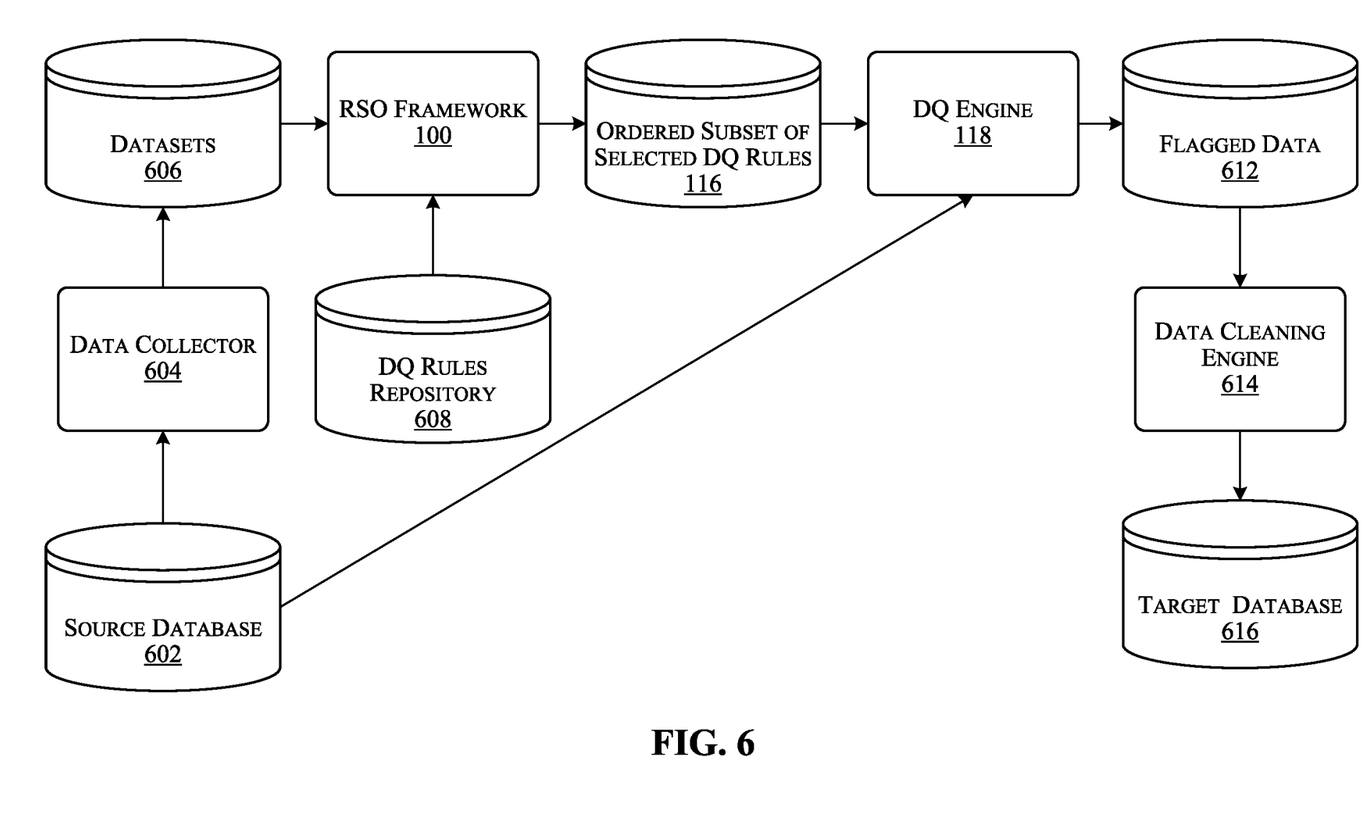
FIG. 6 illustrates an example integration of the framework of FIGS. 1 and 2 within a data processing system that includes both a data quality engine that executes stored data quality rules on datasets and a data cleaning engine for remediating data deficiencies of a dataset.

FIG. 6 illustrates an example integration of RSO framework 100 within a data processing system 600. Illustratively, data processing system 600 receives incoming data from source database 602. Although only source database 602 is shown, data processing system 600 may receive incoming data from any of a variety of different data sources and/or multiple data sources. Data collector 604 collects incoming data into datasets 606, which data processing system 600 receives for ingesting into a data lake or other data repository. Data processing system 600 includes DQ rules repository 608, which electronically stores a set of predetermined DQ rules for detecting data deficiencies. The set of predetermined DQ rules are input to RSO framework 100. RSO framework 100, as described herein, selects and orders certain of the DQ rules based on the rules' performance with respect to a snapshot of a dataset, generating ordered subset of selected DQ rules 116. RSO framework 100 feeds ordered subset of selected DQ rules 116 to DQ engine 610, which executes the selected DQ rules in accordance with the determined order to detect data deficiencies in data received from source database 602. DQ engine 610 flagged data 612 in response to detecting data deficiencies. Data deficiencies of flagged data 612 are remediated by data cleaning engine 614 before being ingested into target database 616 (e.g., data lake, data catalog).

Various aspects of the present disclosure are described herein by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 7:
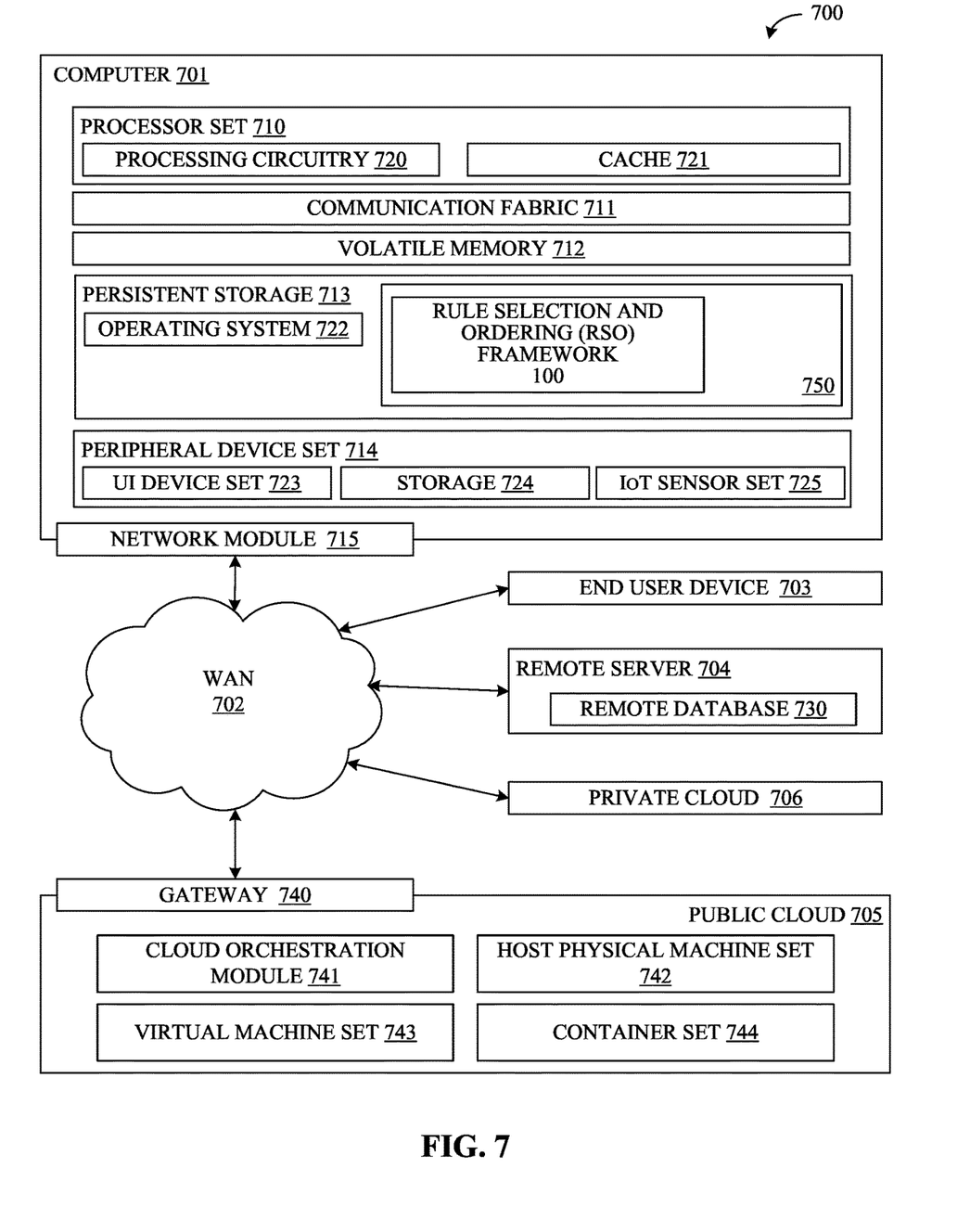
FIG. 7 illustrates an example of a computing environment that is capable of implementing the example RSO framework of FIGS. 1 and 2.

Referring to FIG. 7, computing environment 700 contains an example of an environment for the execution of at least some of the computer code in block 750 involved in performing the inventive methods, such as RSO framework 100 implemented as executable program code or instructions. RSO framework 100, as described herein, automatically selects and orders the running of DQ rules on incoming data that is to be added to a data lake or other data repository. The DQ rules are selected and ordered for execution in accordance with the inventive arrangements in a manner most likely to minimize the computer resources and/or processing time needed for detecting deficiencies of the incoming data and are thus capable of accelerating the process of validating DQ rules and of enhancing processing efficiency of the DQ rules with respect to the incoming data. RSO framework is capable of autonomously changing the selected DQ rules and/or order of execution in response to changes in the distribution of incoming data.

Computing environment 700 additionally includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and RSO framework 100, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

Computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

Processor set 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 750 in persistent storage 713.

Communication fabric 711 is the signal conduction paths that allow the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

Persistent storage 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid-state storage devices. Operating system 722 may take several forms, such as various known proprietary operating systems or open-source Portable Operating System Interface type operating systems that employ a kernel. The code included in block 750 typically includes at least some of the computer code involved in performing the inventive methods.

Peripheral device set 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (e.g., where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

Network module 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (e.g., embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (e.g., the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 703 is any computer system that is used and controlled by an end user (e.g., a customer of an enterprise that operates computer 701) and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

Remote server 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (e.g., private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

The terminology used herein is for the purpose of describing particular embodiments only and is not intended to be limiting. Notwithstanding, several definitions that apply throughout this document will now be presented.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the term "user" refers to a human being.

The terms "first," "second," etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
generating a snapshot of a table-formatted dataset, wherein the snapshot provides a sample comprising a reduced number of rows of the table-formatted dataset such that each column variation of the table-formatted dataset is included in the snapshot;
executing a predetermined collection of data quality (DQ) rules on the snapshot;
determining one or more performance statistics for each of the DQ rules, wherein the performance statistics indicate a likelihood that a DQ rule determines a data quality deficiency;
generating, based on the performance statistics, a subset of the DQ rules, wherein each DQ rule of the subset is selected based on the likelihood that the DQ rule selected detects a quality deficiency; and
generating an order of executing the subset of DQ rules selected, wherein the order generated specifies a sequence for applying each DQ rule of the subset to the table-formatted dataset.

2. The computer-implemented method of claim 1, further comprising:
applying each of ordered subset of selected DQ rules to the table-formatted dataset, wherein the applying is performed in accordance with the ordering; and
flagging each row for which a data deficiency is detected by a DQ rule belonging to the ordered subset of DQ rules.

3. The computer-implemented method of claim 1, further comprising:
generating an updated snapshot in response to a newly received dataset; and
generating, based on the updated snapshot, another ordered subset of selected DQ rules.

4. The computer-implemented method of claim 1, further comprising:
generating an explanation for selecting and ordering execution of each DQ rule belonging to the ordered subset of DQ rules.

5. The computer-implemented method of claim 1, further comprising:
performing data cleaning on each row of the table-formatted dataset having a quality deficiency detected by a DQ rule belonging to the ordered subset of DQ rules, wherein each row is marked for cleaning when a data deficiency is first detected by one of the DQ rules of the ordered subset of DQ rules and no other of the DQ rules executes on the row after the data deficiency is first detected.

6. The computer-implemented method of claim 1, wherein the generating a snapshot includes constructing a bipartite graph comprising two sets of vertices, one set of vertices corresponding to rows of the table-formatted dataset, and one set of vertices corresponding to cell values for each column of the table-formatted dataset.

7. The computer-implemented method of claim 1, wherein the ordering is based on minimizing processing time for detecting one or more quality deficiencies of one or more rows of the table-formatted dataset.

8. A system, comprising:
one or more processors configured to initiate operations including:
generating a snapshot of a table-formatted dataset, wherein the snapshot provides a sample comprising a reduced number of rows of the table-formatted dataset such that each column variation of the table-formatted dataset is included in the snapshot;
executing a predetermined collection of data quality (DQ) rules on the snapshot;
determining one or more performance statistics for each of the DQ rules, wherein the performance statistics indicate a likelihood that a DQ rule determines a data quality deficiency;
generating, based on the performance statistics, a subset of the DQ rules, wherein each DQ rule of the subset is selected based on the likelihood that the DQ rule selected detects a quality deficiency; and
generating an order of executing the subset of DQ rules selected, wherein the order generated specifies a sequence for applying each DQ rule of the subset to the table-formatted dataset.

9. The system of claim 8, wherein the one or more processors are configured to initiate operations further including:
applying each of ordered subset of selected DQ rules to the table-formatted dataset, wherein the applying is performed in accordance with the ordering; and
flagging each row for which a data deficiency is detected by a DQ rule belonging to the ordered subset of DQ rules.

10. The system of claim 8, wherein the one or more processors are configured to initiate operations further including:
generating an updated snapshot in response to a newly received dataset; and
generating, based on the updated snapshot, another ordered subset of selected DQ rules.

11. The system of claim 8, wherein the one or more processors are configured to initiate operations further including:
generating an explanation for selecting and ordering execution of each DQ rule belonging to the ordered subset of DQ rules.

12. The system of claim 8, wherein the one or more processors are configured to initiate operations further including:
performing data cleaning on each row of the table-formatted dataset having a quality deficiency detected by a DQ rule belonging to the ordered subset of DQ rules, wherein a row is marked for cleaning when a data deficiency is first detected by one of the DQ rules belong to the ordered subset of DQ rules and no other of the DQ rules executes on the row after the data deficiency is first detected.

13. The system of claim 8, wherein the generating a snapshot includes constructing a bipartite graph comprising two sets of vertices, one set of vertices corresponding to rows of the table-formatted dataset, and one set of vertices corresponding to cell values for each column of the table-formatted dataset.

14. A computer program product, the computer program product comprising:
one or more computer-readable storage media and program instructions collectively stored on the one or more computer-readable storage media, the program instructions executable by a processor to cause the processor to initiate operations including:
generating a snapshot of a table-formatted dataset, wherein the snapshot provides a sample comprising a reduced number of rows of the table-formatted dataset such that each column variation of the table-formatted dataset is included in the snapshot;

executing a predetermined collection of data quality (DQ) rules on the snapshot;

determining one or more performance statistics for each of the DQ rules, wherein the performance statistics indicate a likelihood that a DQ rule determines a data quality deficiency;

generating, based on the performance statistics, a subset of the DQ rules, wherein each DQ rule of the subset is selected based on the likelihood that the DQ rule selected detects a quality deficiency; and generating an order of executing the subset of DQ rules selected, wherein the order generated specifies a sequence for applying each DQ rule of the subset to the table-formatted dataset.

15. The computer program product of claim 14, wherein the program instructions are executable by the processor to cause the processor to initiate operations further including:

applying each of ordered subset of selected DQ rules to the table-formatted dataset, wherein the applying is performed in accordance with the ordering; and flagging each row for which a data deficiency is detected by a DQ rule belonging to the ordered subset of DQ rules.

16. The computer program product of claim 14, wherein the program instructions are executable by the processor to cause the processor to initiate operations further including:

generating an updated snapshot in response to a newly received dataset; and generating, based on the updated snapshot, another ordered subset of selected DQ rules.

17. The computer program product of claim 14, wherein the program instructions are executable by the processor to cause the processor to initiate operations further including:

generating an explanation for selecting and ordering execution of each DQ rule belonging to the ordered subset of DQ rules.

18. The computer program product of claim 14, wherein the program instructions are executable by the processor to cause the processor to initiate operations further including:

performing data cleaning on each row of the table-formatted dataset having a quality deficiency detected by a DQ rule belonging to the ordered subset of DQ rules, wherein each row is marked for cleaning when a data deficiency is first detected by one of the DQ rules of the ordered subset of DQ rules and no other of the DQ rules executes on the row after the data deficiency is first detected.

19. The computer program product of claim 14, wherein the generating a snapshot includes constructing a bipartite graph comprising two sets of vertices, one set of vertices corresponding to rows of the table-formatted dataset, and one set of vertices corresponding to cell values for each column of the table-formatted dataset.

20. The computer program product of claim 14, wherein the ordering is based on minimizing processing time for detecting one or more quality deficiencies of one or more rows of the table-formatted dataset.

* * * * *